3,838,122
2-HETEROCYCLIC-1,3-BENZODIAZEPINES

John T. Suh, 3709 W. Scenic Drive 111 N., Mequon, Wis. 53092, and Richard A. Schnettler, 6234 W. Donges Lane, Brown Deer, Wis. 53223
No Drawing. Filed June 30, 1972, Ser. No. 268,128
Int. Cl. C07d 51/70, 53/04, 87/38
U.S. Cl. 260—247.5 B                              8 Claims

ABSTRACT OF THE DISCLOSURE

The 2-heterocyclic-1,3-benzodiazepines and their pharmaceutically acceptable acid addition salts are antihypertensive agents. Compounds disclosed are 2-morpholino-4,5-dihydro-7,8-dimethoxy-3H-1,3-benzodiazepine hydroiodide and 2-N-methylpiperazino - 4,5 - dihydro-3H-1,3-benzodiazepine hydroiodide.

DETAILED DESCRIPTION

The compounds of the present invention have the following formula

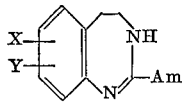

in which X and Y are selected from hydrogen, hydroxy, halogen, $CF_3$, alkyl of 1 to 4 carbon atoms or alkoxy of 1 to 4 carbon atoms, especially methoxy, and Am is a heterocyclic amine such as morpholino, N - alkylpiperazino, pyrrolidino, N-furoylpiperazino, N-benzoylpiperazino, N - piperonylpiperazino, N - piperonoylpiperazino, N-thienylpiperazino and N-thienoylpiperazino.

BACKGROUND OF THE INVENTION

U.S. Pat. No. 3,496,179 discloses 2-amino-3,4-dihydroquinazolines which are antihypertensive agents and an article by H. R. Rodriguez et al., *J. Org. Chem., 33*, 670 (1968) discloses the compound 2-amino-4,5-dihydro-7,8-dimethoxy-3H-1,3-benzodiazepine.

PREPARATION OF THE COMPOUNDS

The compounds of the present invention are readily prepared from β-(2-aminophenyl)ethylamines of the formula

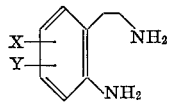

which are known compounds.

Representative of the amines that may be used as starting materials are the following:

β-(2-aminophenyl)ethylamine,
β-(2-amino-4,5-dimethoxyphenyl)ethylamine,
β-(2-amino-4,5-dichlorophenyl)ethylamine,
β-(2-amino-4,5-ditrifluoromethylphenyl)ethylamine, and
β-(2-amino-4,5-dimethylphenyl)ethylamine.

The compounds of the invention are conveniently prepared by reacting the selected β-(2-aminophenyl)ethylamine with carbon disulfide in ethanol to form the corresponding 2,3,4,5 - tetrahydro-1H-1,3-benzodiazepine-2-thione which when treated with methyliodide in a mixture of methanol and ethanol forms the corresponding 2-methylmercapto-4,5-dihydro - 3H - 1,3 - benzodiazepine hydrochloride. The thus obtained hydrochloride is then dissolved in anhydrous acetonitrile and reacted with an appropriate heterocyclic amine under reflux conditions to form the desired 2-heterocyclic-1,3-benzodiazepine.

The described process may be illustrated as follows:

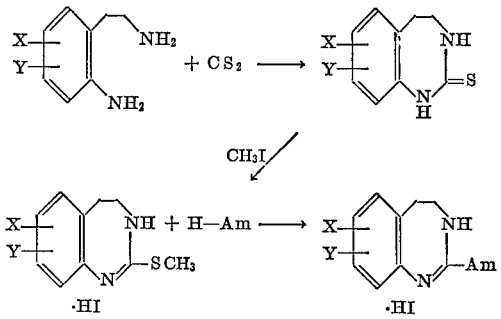

in which X, Y and Am are as previously defined.

Representative of the amines which may be employed in the described process are the following:

morpholine,
N-methylpiperazine,
pyrrolidine,
N-2-furoylpiperazine,
N-2-thienoylpiperazine,
N-benzoylpiperazine,
N-piperonoylpiperazine,
N-2-furylpiperazine,
N-2-thienylpiperazine, and
N-piperonylpiperazine.

Among the compounds which may be prepared by the described process are the following:

2-morpholino-4,5-dihydro-7,8-dimethoxy-3H-1,3-benzodiazepine hydroiodide,
2-morpholino-4,5-dihydro-3H-1,3-benzodiazepine hydroiodide,
2-(N-methylpiperazino)-4,5-dihydro-7,8-dimethoxy-3H-1,3-benzodiazepine hydroiodide,
2-N-methylpiperazino-4,5-dihydro-3H-1,3-benzodiazepine hydroiodide,
2-pyrrolidino-4,5-dihydro-7,8-dimethoxy-3H-1,3-benzodiazepine hydroiodide,
2-[N-(N'-2-furoylpiperazino)]-4,5-dihydro-7,8-dimethoxy-3H-1,3-benzodiazepine hydroiodide hydrate,
2-[N-(N'-3-furoylpiperazino)]-4,5-dihydro-7,8-dimethoxy-3H-1,3-benzodiazepine hydroiodide hydrate,
2-[N-(N'-2-thienoylpiperazino)]-4,5-dihydro-7,8-dimethoxy-3H-1,3-benzodiazepine hydroiodide hydrate,
2-[N-(N'-2-thienylpiperazino)]-4,5-dihydro-7,8-dimethoxy-3H-1,3-benzodiazepine hydroiodide hydrate,
2-[N-(N'-piperonoylpiperazino)]-4,5-dihydro-7,8-dimethoxy-3H-1,3-benzodiazepine hydroiodide hydrate, and
2-[N-(N'-1-piperonylpiperazino)]-4,5-dihydro-7,8-dimethoxy-3H-1,3-benzodiazepine hydroiodide hydrate.

The compounds in which X and/or Y are hydroxy may be readily prepared from the corresponding compounds in which X and Y are aralkoxy or alkoxy by conventional procedures.

Acid addition salts of the compounds of the present invention may be conveniently produced by contacting the free base form of the compounds with a suitable acid such as sulfuric acid, hydrochloric acid, succinic acid, tartaric acid, benzoic acid or fumaric acid.

The thiocyanic acid addition salts of the compounds when condensed with formaldehyde form resinous materials useful as pickling agents according to U.S. Pats. 2,425,320 and 2,606,155. The compounds also form fluosilicic acid addition salts which are useful as mothproofing agents according to U.S. Pats. 1,915,334 and 2,075,359.

The compounds of the invention are pharmacologically active. For example, the compounds 2-N-methylpiperazino-4,5-dihydro-3H-1,3-benzodiazepine hydroiodide and 2 - [N - (N' - 2 - furoylpiperazino)]-4,5-dihydro-3H-1,3-benzodiazepine hydroiodide, when evaluated in mouse behavioral studies at intraperitoneal doses of 30 to 300 mg./kg. were found to produce behavioral profiles resembling those of known skeletal muscle relaxants. The mouse behavioral studies also indicated that the compounds were relatively safe and possessed $LD_{50}$'s in excess of 175 mg./kg. of body weight. The behavioral studies were conducted essentially in accordance with the procedure outlined by S. Irwin in "Animal and Clinical Pharmacologic Techniques in Drug Evaluation," J. H. Nodine and P. E. Seigler, Ed., Year Book Medical Publishers, Inc., 1964. In the standard anesthetized, vagotomized cat preperation, the forementioned compounds were found at intravenous doses of 10 mg./kg. to substantially decrease the blood pressure of the animals.

When intended for pharmaceutical use, the compounds are preferably combined with one or more suitable pharmaceutical diluents and additives and formed into unit dosage forms for oral or parenteral administration such as tablets, capsules and solutions.

The following examples are presented to illustrate this invention:

Example 1

7,8-Dimethoxy-2,3,4,5-tetrahydro-1H-1,3-benzodiazepin-2-thione

In 160 ml. ethanol 10.0 g. (0.0442 mole) β-(2-nitro-4,5-dimethoxyphenyl)ethylamine is dissolved and 0.2 g. platinum oxide is suspended. The mixture is shaken until the theoretical amount of hydrogen is taken up. The mixture is filtered and set aside.

In 20 ml. ethanol 7.6 g. (0.1 mole) carbon disulfide is dissolved. The solution is chilled to 0° C. and the above solution slowly added dropwise over a one hour period. The solution is maintained at 0° C. during the addition and then allowed to stir at room temperature for 48 hours and finally refluxed 2 hours. The system is cooled and the solid collected to give 7,8-dimethoxy-2,3,-4,5-tetrahydro-1H-1,3-benzodiazepin-2-thione as a yellow solid, m.p. 250°.

Example 2

2-Methylmercapto-7,8-dimethoxy-4,5-dihydro-3H-1,3-benzodiazepine hydroiodide

In 200 ml. methanol is suspended 18.70 g. (0.0785 mole) 7,8 - dimethoxy - 2,3,4,5-tetrahydro-1H-1,3-benzodiazepin-2-thione and 11.2 g. (0.079 mole) methyl iodide is added dropwise. The mixture is refluxed and stirred 2 hours, colled and filtered. The filtrate is diluted with ether until all the solid has precipitated to give 2-methylmercapto - 7,8-dimethoxy-4,5-dihydro-3H-1,3-benzodiazepine hydroiodide as a beige solid, m.p. 197–200°.

Example 3

2,3,4,5-Tetrahydro-1H-1,3-benzodiazepin-2-thione

In 50 ml. ethanol is dissolved 9.2 g. (0.12 mole) carbon disulfide and the solution is chilled in an icebath. β-(2-aminophenyl)ethylamine is slowly added over a 30 minute period. The mixture is allowed to stand for 17 hours at room temperature and then refluxed for 2 hours, cooled, and the solid collected to give 2,3,4,5-tetrahydro-1H-1,3-benzodiazepin-2-thione, m.p. 195°.

Example 4

2-Methylmercapto-4,5-dihydro-3H-1,3-benzodiazepine hydroiodide

In a mixture of 100 ml. ethanol and 100 ml. methanol is dissolved 4.54 g. (0.0255 mole) 2,3,4,5-tetrahydro - 1H - 1,3-benzodiazepin-2-thione and 3.64 g. (0.026 mole)methyl iodide. The mixture is refluxed one hour and concentrtaed to 50 ml., filtered, and diluted with ether to precipitate the salt. 2-Methylmercapto-4,5-dihydro-3H-1,3-benzodiazepine hydroiodide as a white solid is collected, m.p. 175°.

Example 5

2-Morpholino-4,5-dihydro-7,8-dimethoxy-3H-1,3-benzodiazepine hydroiodide

In 25 ml. dry acetonitrile is dissolved 3.0 g. (0.0079 mole) 2-methylmercapto-4,5-dihydro-7,8-dimethoxy-3H-1,3-benzodiazepine hydroiodide and 0.87 g. (0.01 mole) morpholine. The solution is refluxed 15 hours, cooled, and the solid which forms is collected and recrystallized two times from acetonitrile to give 2-morpholino-4,5-dihydro-7,8-dimethoxy-3H-1,3-benzodiazepine hydroiodide as a white solid, m.p. 257–259°.

*Anal.*—Calcd. for $C_{15}H_{22}N_3O_3I$: C, 42.97; H, 5.29; N, 10.03. Found: C, 43.56; H, 5.24; N, 9.98.

Example 6

2-Morpholino-4,5-dihydro-3H-1,3-benzodiazepine hydroiodide

In 30 ml. dry acetonitrile is dissolved 5.0 g. (0.0157 mole) 2 - methylmercapto-4,5-dihydro-3H-1,3-benzodiazepine hydroiodide and 2.72 g. (0.0314 mole) morpholine. The solution is refluxed for 15 hours, cooled, and diluted with 30 ml. dry ether. The solid is collected and recrystallized from acetonitrile/ether to give 2-morpholino-4,5-dihydro - 3H-1,3-benzodiazepine hydroiodide as a white solid, m.p. 184–186°.

*Anal.*—Calcd. for $C_{13}H_{18}N_3OI$: C, 43.46; H, 5.05; N, 11.70. Found: C, 43.62; H, 5.33; N, 11.47.

Example 7

2-N-Methylpiperazino-4,5-dihydro-7,8-dimethoxy-3H-1,3-benzodiazepine hydroiodide In 25 ml. dry acetonitrile is dissolved 2.73 g. (0.0072 mole) 2-methylmercapto-4,5-dihydro-7,8-dimethoxy-3H-1,3-benzodiazepine hydroiodide and 1.00 g. (0.001 mole) N-methylpiperazine. The mixture is refluxed 15 hours, cooled, and the solid collected and recrystallized from ethanol to give 2-N-methylpiperazino-4,5-dihydro-7,8-dimethoxy-3H-1,3-benzodiazepine hydroiodide as a white solid, m.p. 278–280° C.

*Anal.*—Calcd. for $C_{16}H_{25}N_4O_2I$: C, 44.14; H, 5.79; N, 12.87. Found: C, 44.37; H, 5.79; N, 12.92.

Example 8

2-N-Methylpiperazino-4,5-dihydro-3H-1,3-benzodiazepine hydroiodide

In 50 ml. dry acetonitrile is dissolved 3.03 g. (0.0095 mole) 2 - methylmercapto-4,5-dihydro-3H-1,3-benzodiazepine hydroiodide and 1.90 g. (0.0190 mole) N-methylpiperazine. The mixture is refluxed 18 hours, cooled, and the solid collected and recrystallized from ethanol to give 2 - N - methylpiperazino-4,5-dihydro-3H-1,3-benzodiazepine hydroiodide as white crystals, m.p. 249–250°.

*Anal.*—Calcd. for $C_{14}H_{21}N_4I$: C, 45.17; H, 5.69; N, 15.05. Found: C, 44.94; H, 5.52; N, 15.33.

Example 9

2-Pyrrolidino-4,5-dihydro-7,8-dimethoxy-3H-1,3-benzodiazepine

In 30 ml. dry acetonitrile is dissolved 3.24 g. (0.0085 mole) 2-methylmercapto-4,5-dihydro-7,8-dimethoxy-3H-1,3-benzodiazepine hydroiodide and 1.07 g. (0.015 mole) pyrrolidine. The mixture is refluxed 6 hours, cooled, and solvent evaporated. The residue is triturated with isopropanol and the solid collected. The solid is recrystallized from ethanol to give 2 - pyrrolidino-4,5-dihydro-7,8-dimethoxy-3H-1,3-benzodiazepine as white crystals, m.p. 268–270°.

*Anal.*—Calcd. for $C_{15}H_{22}N_3O_2I$: C, 44.67; H, 5.50; N, 10.42. Found: C, 44.92; H, 5.60; N, 10.42.

Example 10

2-[N-(N'-2-Furoylpiperazino)]-4,5-dihydro-7,8-dimethoxy-3H-1,3-benzodiazepine hydroiodide hydrate In 25 ml. dry acetonitrile is dissolved 2.0 g. (0.0053 mole) 2-methylmercapto-4,5-dihydro-7,8-dimethoxy-3H-1,3-benzodiazepine hydroiodide and 1.90 g. (0.010 mole) N-2-furoylpiperazine. The mixture is refluxed 15 hours, cooled, and the solid collected. The material is recrystallized from methanol to give 2 - [N-(N'-2-furoylpiperazino)] - 4,5 - dihydro-7,8-dimethoxy-3H-1,3-benzodiazepine hydroiodide hydrate as a white solid which softens with foaming at 150–160° and then resolidifies and melts at 235° C.

*Anal.*—Calcd. for $C_{20}H_{25}N_4O_4I$: C, 45.29; H, 5.14; N, 10.56. Found: C, 44.85; H, 5.18; N, 10.27.

Example 11

2-[N-(N'-2-Furoylpiperazino)]-4,5-dihydro-3H-1,3-benzodiazepine hydroiodide

In 25 ml. dry acetonitrile is dissolved 5.0 g. (0.0156 mole) 2 - methylmercapto-4,5-dihydro-3H-1,3-benzodiazepine hydroiodide and 5.65 g. (0.0313 mole) N-2-furoylpiperazine. The solution is refluxed 48 hours and the solvent evaporated. The residue is dissolved in 25 ml. isopropanol and allowed to crystallize. Recrystallization from isopropanol gives 2-[N-(N'-2-furoylpiperazino)]-4,5-dihydro-3H-1,3-benzodiazepine hydroiodide as a beige solid, m.p. 204–206° C.

*Anal.*—Calcd. for $C_{18}H_{21}N_4O_2I$: C, 47.80; H, 4.68; N, 12.39. Found: C, 47.71; H, 5.03; N, 12.26.

Example 12

2-[N-(N'-2-Thienylmethylpiperazino)]-4,5-dihydro-3H-1,3-benzodiazepine hydroiodide A mixture of 4.8 g. (0.015 mole) of 2-methylmercapto-4,5-dihydro-3H-1,3-benzodiazepine hydroiodide and 5.4 g. (0.03 mole) of N-2-thienylmethylpiperazine in 50 ml. of dry acetonitrile is refluxed for 18 hours. The solvent is evaporated and the remaining gummy solid triturated in hot isopropyl alcohol. The solids that form are filtered and recrystallized from methyl alcohol to afford 2-[N-(N' - 2 - thienylmethylpiperazino)]-4,5-dihydro-3H-1,3-benzodiazepine hydroiodide, m.p. 232–234.5°, as beige crystals.

*Anal.*—Calcd. for $C_{18}H_{23}IN_4S$: C, 47.58; H, 5.10; N, 12.33. Found: C, 47.26; H, 4.82; N, 12.18.

Example 13

2-[N-(N'-Piperonylpiperazino)]-4,5-dihydro-3H-1,3-benzodiazepine hydroiodide

A mixture of 5.8 g. (0.018 mole) of 2-methylmercapto-4,5-dihydro-3H-1,3-benzodiazepine hydroiodide and 7.9 g. (0.036 mole) of N-piperonylpiperazine in 200 ml. of dry acetonitrile is refluxed for 10 hours. The solvent is evaporated and the residue recrystallized two times from isopropyl alcohol and one time from methyl alcohol to afford 2-[N-(N'-piperonylpiperazino)]-4,5-dihydro-3H-1,3-benzodiazepine hydroiodide as white crystals, m.p. 273–275°.

*Anal.*—Calcd. for $C_{21}H_{25}IN_4O_2$: C, 51.23; H, 5.12; N, 11.38. Found: C, 51.30; H, 5.44; N, 11.25.

We claim:

1. A compound selected from a compound of the formula

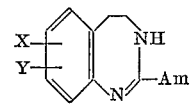

and pharmaceutically acceptable salts thereof, in which X and Y are hydrogen, or lower alkoxy of 1 to 4 carbon atoms and Am is a heterocyclic amine selected from morpholino, N-alkyl piperazino, pyrrolidino, N-furoylpiperazino, N-piperonylpiperazino, and N-thienylpiperazino.

2. A compound of claim 1 in which X and Y are hydrogen or methoxy.

3. A compound of claim 1 in which X and Y are hydrogen.

4. The compound of claim 1 which is 2-[N-(N'-2-thienoylpiperazino)]-4,5-dihydro-3H-1,3-benzodiazepine.

5. A compound of claim 1 in which Am is morpholino.

6. A compound of claim 1 in which Am is pyrrolidino.

7. A compound of claim 1 in which X and Y are hydrogen or methoxy and Am is N-methylpiperazino.

8. The compound of claim 1 which is 2-N-furoylpiperazinyl-4,5-dihydro-3H-1,3-benzodiazepine.

References Cited

UNITED STATES PATENTS 3,496,179   2/1970   Hess _____ 260—256.4

OTHER REFERENCES

Rodriguez et al.: J. Org. Chem. *33*, 670 (1968).

G. THOMAS TODD, Primary Examiner

U.S. Cl. X.R.

260—268 BC, 326.5 G, 326.81; 424—248, 250, 274